(12) United States Patent
Claudius

(10) Patent No.: US 9,172,675 B2
(45) Date of Patent: Oct. 27, 2015

(54) METHODS AND APPARATUS FOR NETWORK COMMUNICATION

(75) Inventor: Jonathan Claudius, Aurora, IL (US)

(73) Assignee: TRUSTWAVE HOLDINGS, INC., Chicago, IL (US)

( * ) Notice: Subject to any disclaimer, the term of this patent is extended or adjusted under 35 U.S.C. 154(b) by 338 days.

(21) Appl. No.: 13/483,009

(22) Filed: May 29, 2012

(65) Prior Publication Data

US 2012/0300650 A1 Nov. 29, 2012

Related U.S. Application Data

(60) Provisional application No. 61/490,526, filed on May 26, 2011.

(51) Int. Cl.
*H04L 12/28* (2006.01)
*H04L 29/12* (2006.01)

(52) U.S. Cl.
CPC .......... *H04L 61/2532* (2013.01); *H04L 61/256* (2013.01); *H04L 61/2514* (2013.01); *H04L 61/2535* (2013.01)

(58) Field of Classification Search
CPC ............ H04L 61/2514; H04L 61/2517; H04L 29/12377; H04L 29/125; H04L 63/029; H04L 61/2503; H04L 61/256; H04L 61/2532; H04L 61/2535; G06F 12/10
USPC ......... 370/328, 329, 351, 392, 389, 401, 238, 370/241, 252; 709/225–229, 245
See application file for complete search history.

(56) References Cited

U.S. PATENT DOCUMENTS

| | | | | |
|---|---|---|---|---|
| 6,587,438 | B1 * | 7/2003 | Brendel | 370/238 |
| 7,992,199 | B1 * | 8/2011 | Winick et al. | 726/11 |
| 2004/0024879 | A1 * | 2/2004 | Dingman et al. | 709/227 |
| 2006/0013192 | A1 * | 1/2006 | Le et al. | 370/351 |
| 2008/0031249 | A1 * | 2/2008 | Valtchev et al. | 370/392 |
| 2010/0165848 | A1 * | 7/2010 | Iwazaki et al. | 370/241 |

OTHER PUBLICATIONS

"Transmission Control Protocol, DARPA Internet Program, Protocol Specification," Information Sciences Institute, University of Southern California, Sep. 1981, 81 pages.
"Port Scanning Techniques," Nmap Network Scanning, Chapter 15. Nmap Reference Guide, http://nmap.org/book/man-port-scanning-techniques.html, Retreived on May 29, 2012, 5 pages.
THC Bolg, "Port Scanning the Internet," http://blog.thc.org/index.php?/archives/2-Port-Scanning-the-Internet.html, Aug. 10, 2008, 203 pages.

* cited by examiner

*Primary Examiner* — Kwang B Yao
*Assistant Examiner* — Harun Chowdhury
(74) *Attorney, Agent, or Firm* — Hanley, Flight & Zimmerman, LLC

(57) ABSTRACT

Methods and apparatus for network communication are disclosed. An example method includes sending an initial packet to a network device, receiving a response packet that is a response to the initial packet and includes a parameter that does not match the initial packet, determining that the response packet is a response to the initial packet, and in response to determining that the response packet is a response, determining that the network device is responsive to network requests.

24 Claims, 9 Drawing Sheets

PRIORT ART

METHODS AND APPARATUS FOR NETWORK COMMUNICATION

RELATED APPLICATION

This patent claims priority to U.S. Provisional Application Ser. No. 61/490,526, which was filed on May 26, 2011, and is hereby incorporated herein by reference in its entirety.

FIELD OF THE DISCLOSURE

This disclosure relates generally to network communication, and, more particularly, to methods and apparatus for network communication.

BACKGROUND

In many private networks there are more devices inside the private network than there are public network address (e.g., Internet protocol (IP) addresses) assigned to the network owner/provider. For example, a business may have a single public network address on the Internet. The public address may be assigned to an edge network element (e.g. a gateway, a router, a switch, etc.) of the private network. The business may have many computers (e.g., 10, 100, 1000, etc.) on the private network. Each computer on the private network is typically assigned a private address. Processes such as network address translation (NAT), port translation, etc. enable computers on the public network (e.g., the Internet) to communicate with the computers on the private network. In such processes, communications from the public side of the network are routed to computers on the private side of the network.

NAT operations modify the source and/or destination network address of a packet to facilitate communication between computers on the public network and computers on the private network. For example, a gateway that supports NAT may receive a communication packet from a computer or other network element on the public side of the gateway (e.g., a network adapter connected to the Internet) that identifies a public address of the gateway as the destination network address. If the gateway determines that the packet is destined for a computer or other network element on the private side of the network (e.g., by comparing a destination port of the packet to a table, by comparing packet parameters to a state table, etc.), the gateway modifies the packet to replace the destination network address (originally identifying the network address of the gateway) with the private network address of the computer on the private network. Accordingly, the packet is routed to the destination computer. A similar process occurs when the computer on the private network transmits a packet destined for the computer on the public network. When the gateway receives the packet from the computer on the private network, the gateway replaces the source network address of the packet (originally identifying the private network address of the computer on the private network) with the public network address of the gateway on the public network. Accordingly, the packet is routed over the public network to the computer on the public network.

Port translation may be performed in addition to network address translation. Port translation modifies the port of a packet according to rules stored at the gateway to the private network. For example, two computers on a private network may host services on the same service port. Accordingly, if only one public network address is assigned to the network, both computers cannot provide their services to the public network on the same service port. The gateway may transmit requests destined for the service port to a first one of the computers without modification. The gateway may associate an alternate port with the second one of the computers (e.g., the port number incremented by one: 80+1=81, any suitable port number may be used such as a port in the range of 1 to 65535). When a packet is received that is destined for the alternate port, the gateway modifies the destination service port of the packet before transmitting the packet to the second one of the computers. When the second one of the ports transmits a packet from the service port, the gateway modifies the source port of the packet to identify the alternate port so that the packet will be recognized by the receiving system.

DETAILED DESCRIPTION

Figure 1:
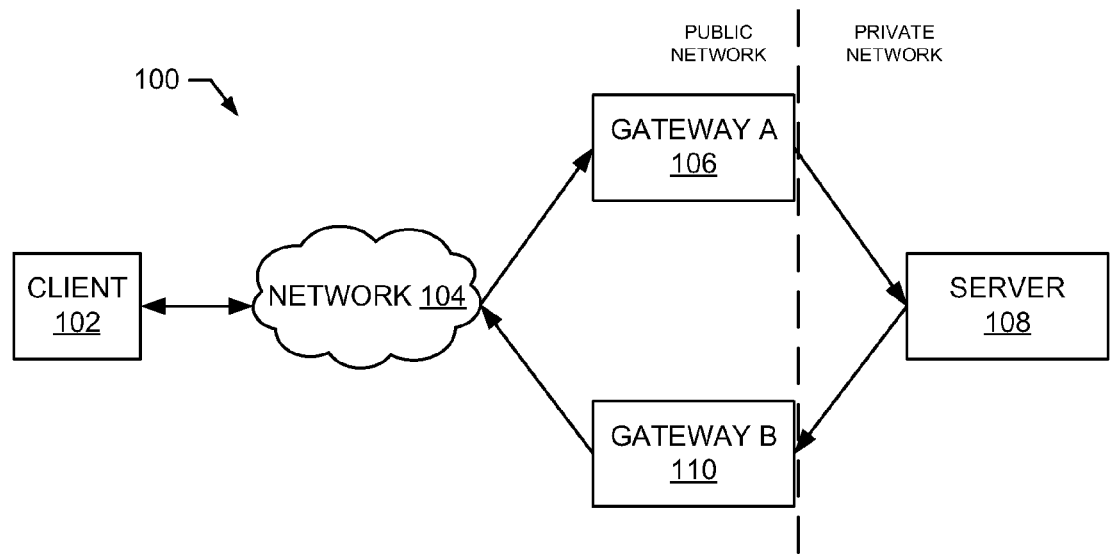
FIG. 1 is a block diagram of an example network in which packet parameter mismatch may occur.

In some networks that include network address translation (NAT) and/or other public to private network translation systems, responses to packets may include mismatched parameters. For example, a client may send a packet to a destination network address associated with a server (e.g., the destination network address may be the public address of a server residing on a private network). The client expects a response to the packet to include certain parameters. For example, the client may expect that the response packet will identify the client as the destination for the response packet and will identify the destination network address associated with the server as the source for the response packet. However, if one or more of the parameters of the packet does not match the expectations of the client, the client will terminate the communication associated with the response packet and continue awaiting a proper response. In such circumstances, the client will likely timeout when no proper response packet is received.

A network topology that results in packet parameter mismatching may result in the inability of a client to communicate with a server. The problem may be identified after complaints from clients. Typically, such a problem is resolved by a network administrator reviewing the routing rules and translation rules of gateways and other network elements.

In some instances, it may not be intended that the server communicates with the public network. To verify that the server does not communicate with the public network, a test client may attempt to communicate with the server (e.g., by sending a probe communication such as a communication session initiation packet, a ping request, etc.). Prior art test clients that receive packets that include mismatched parameters will drop the communications from the mismatched parameters, timeout the communication attempt with the server, and determine that the server does not communicate with the public network. However, as described in further detail in conjunction with FIGS. 1-3, the server may be open to communication from the public network and may respond to such communication.

For example, methods and apparatus disclosed herein facilitate communication with servers in networks in which packet parameter mismatch occurs. As disclosed herein, example clients and/or gateway(s) may determine, based on packet responses from a server, that packet mismatch has occurred, may communicate with the server despite the packet parameter mismatch, and/or may modify the packet to compensate for packet parameter mismatch. Accordingly, example methods and apparatus disclosed herein may facilitate discovery of servers and/or networks that are open for communication in instances that result in packet parameter mismatch (where prior art systems would determine that the servers and/or networks are closed due to the packet mismatch). Additionally, example methods and apparatus disclosed herein may facilitate communication with servers in instances of packet parameter mismatch.

As used herein, a client is any computer or other network element that initiates communication. A server is any computer or other network element that is able to respond to a request for data from a client. The same computer or network element may be considered a client when the computer or network element initiates communication and may also be considered a server when the computer or network element receives is able to respond to a request for data from a client. The term server is not limited to a dedicated server computer. As used herein, the term gateway refers to any network element that resides between two or more networks (e.g., a public and a private network, two different public networks, two different private networks, etc.) and manages translation to facilitate communication amongst devices on the two or more networks. While network communications are generally described herein, and some particular network protocols and topologies are described, reference to network protocols and network topologies are provided as examples. This disclosure is not limited to any particular network protocol or network topology. Example methods and apparatus described herein may be used with any suitable network protocol(s) and topology(ies). For clarity of description, the description of network communication is simplified. Additional operations for one or more layers of communication may be performed to facilitate communication among network elements.

The networks described herein may include any type(s) of network(s) such as one or more of a wide area network, a local area network, a virtual private network, a wired network, a wireless network, and so forth. In any of the networks described herein, the connection between two network elements may be facilitated by multiple intervening network elements.

An example network 100 in which a packet parameter mismatch may occur is illustrated in FIG. 1. The example network 100 includes a client 102 that transmits a packet via the network 104 to a gateway A 106. The gateway A 106 is connected to both the network 104 that is a public network and a private network on which a server 108 resides. The gateway A 106 recognizes that the packet is to be handled by the server 108. For example, the gateway A 106 may include a NAT table that indicates that packets destined for a particular network port are to be handled by the server 108. The gateway A 106 translates the packet to the private network and transmits the packet to the server 108. The server 108 generates a response for transmission to the client 102. However, instead of the packet routing back to the public network via the gateway A 106, the packet is routed to the public network via a gateway B 110. For example, the server 108 may include a routing table that directs all outgoing packets to be routed to the gateway B 110. Thus, the gateway B 110 translates the packet to the public network and transmits the packet to the client 102 via the network 104. However, when the client 102 receives the packet from the gateway B 110, the client does not recognize the sender of the packet (gateway B 110) and terminates communication with gateway B 110. Eventually, the client 102 determines that the server is not going to respond (because the client 102 has not received a response from gateway A 106) and times out. Accordingly, if the client 102 were probing to determine if server 108 was available for communication from the public network, the client 102 would determine that the server 108 is not available (despite the server 108 receiving the packet from the client 102 and sending a response).

Figure 2:
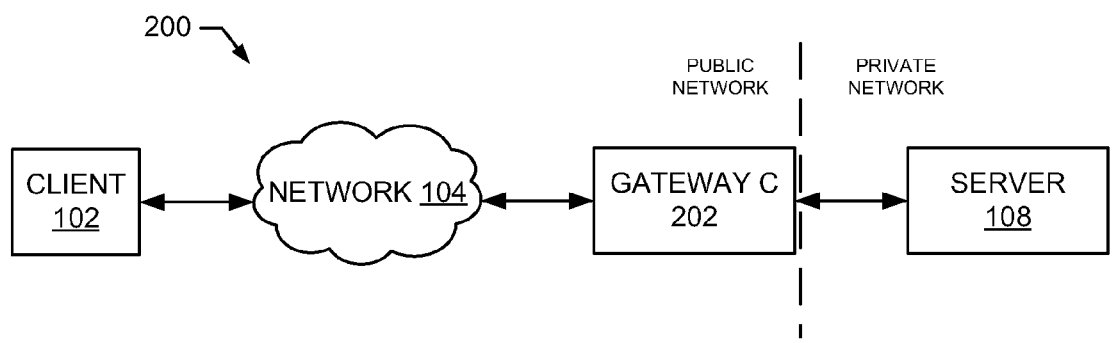
FIG. 2 is a block diagram of an example network in which packet parameter mismatch may occur.

Another example network 200 in which a packet parameter mismatch may occur is illustrated in FIG. 2. The example network 200 includes the client 102 that transmits a packet via the network 104 to a gateway C 202. The gateway C 202 is connected to both the network 104 that is a public network and a private network on which the server 108 resides. The gateway C 202 recognizes that the packet is to be handled by the server 108. For example, the gateway C 202 may include a NAT table that indicates that packets destined for a particular network port are to be handled by the server 108. The gateway C 202 translates the packet to the private network and transmits the packet to the server 108. The server 108 generates a response packet for transmission to the client 102. The response packet is transmitted to the gateway C 202. However, when the gateway C 202 translates the packet to the public network, the packet does not correspond to the parameters of the packet that was transmitted from the client 102. For example, the gateway C 202 may include a public network address in the packet that is different than the public network address to which the client 102 transmitted the initial packet (similar to the operation in FIG. 1), the gateway C 202 may modify the ports identified in the packet, etc. Accordingly, when the client 102 receives the packet from the gateway C 202 via the network 104, the client 102 does not recognize the packet as a response to the initial communication (or any other communication) and terminates the communication session. Eventually, the client 102 determines that the server is not going to respond (because the client 102 has not received a recognized response from the gateway C 202) and times out. Accordingly, if the client 102 were probing to determine if server 108 was available for communication from the public network, the client 102 would determine that the server 108 is not available (despite the server 108 receiving the packet from the client 102 and sending a response).

Figure 3:
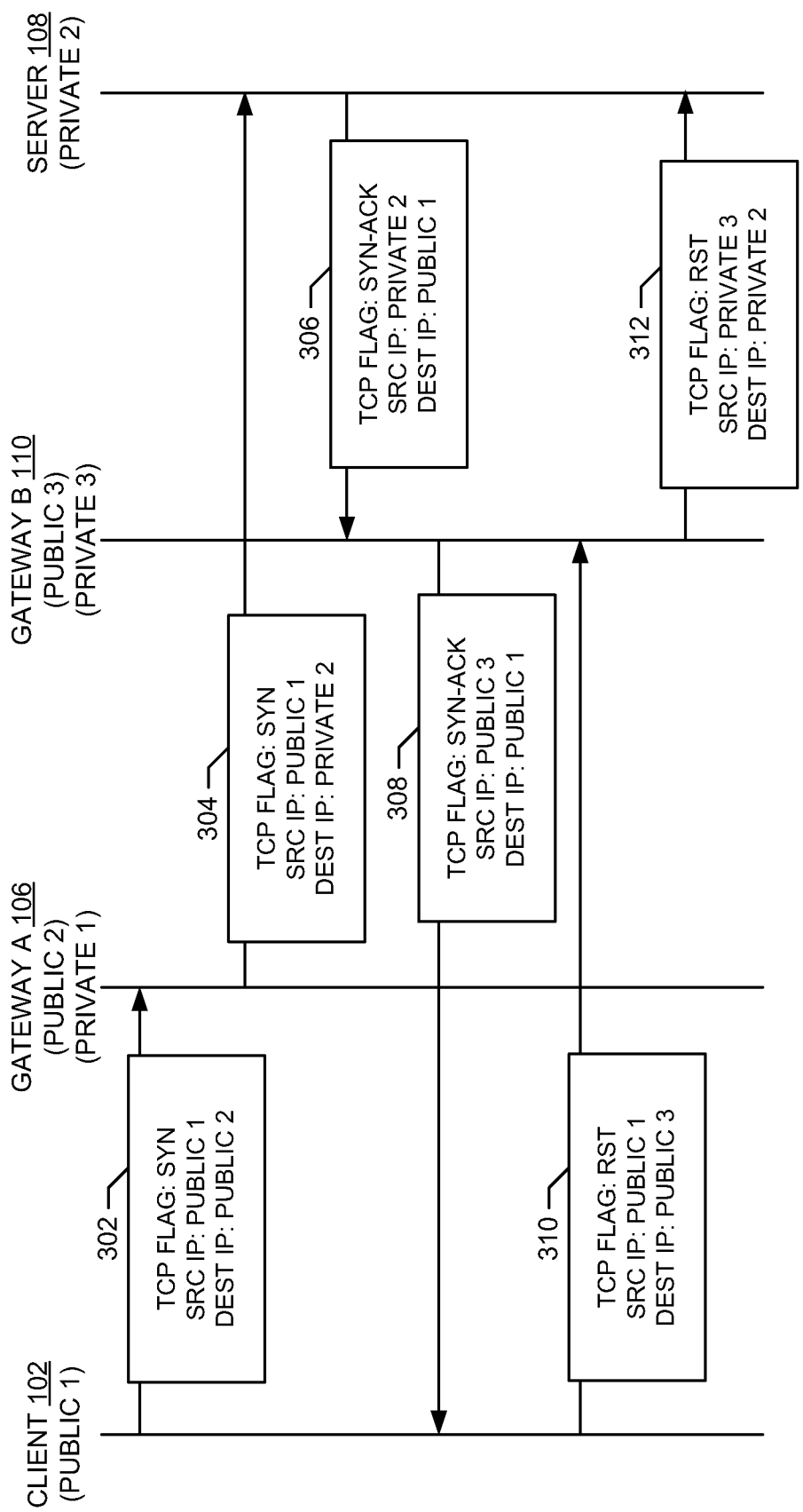
FIG. 3 is an example message diagram illustrating communication including mismatched packets in conjunction with the network of FIG. 1.

FIG. 3 is an example message diagram illustrating communication including mismatched packets in conjunction with the network 100 of FIG. 1. The message diagram is applicable to other networks such as the network 200 of FIG. 2. For example, the messages received and transmitted by the gateway A 106 and the gateway B 110 may be received and transmitted by the gateway C 202.

According to the illustrated example of FIG. 3, the client 102 has a public network address of PUBLIC 1, the gateway A 106 has a public network address of PUBLIC 2 and a private network address of PRIVATE 1, the gateway B 110 has a public network address of PUBLIC 3 and a private network address of PRIVATE 3, and the server 108 has a private network address of PRIVATE 2.

The message diagram of FIG. 3 begins when the client 102 transmits packet 302 to the gateway A 106. Packet 302 is a synchronize packet to initiate a communication session with server 108 and, accordingly, the TCP FLAG parameter identifies SYN. The source network address (e.g., Internet protocol (IP) address) identifies PUBLIC 1 and the destination network address identifies PUBLIC 2. Accordingly, the packet 302 is routed (e.g., via intermediate network elements) to gateway A 106. Gateway A 106 determines that the packet 302 is to be handled by server 108 (e.g., based on a destination port parameter included in the packet (not illustrated)). Accordingly, the gateway A 106 modifies the packet 302 to form packet 304 by replacing the destination network address with PRIVATE 2. The gateway A 106 forwards the packet 304 to the server 108.

The server 108, in this example, is open to receiving packets on the port identified by the packet (not shown). Accordingly, the server 108 processes the packet and responds by generating packet 306. Packet 306 includes the TCP FLAG parameter SYN-ACK, which is an acknowledgement (ACK) of packet 302/304 and an attempt to initiate a communication session between the server 108 and the client 102 (SYN). In the packet 306, the source network address parameter identifies PRIVATE 2 and the destination network address parameter identifies PUBLIC 1 (the public network address of client 102). Due to routing rules, filters, gateway settings, network settings, or any other reason, the server 108 transmits the packet 306 to gateway B 110 (instead of gateway A 106). As a part of NAT, gateway B 110 replaces the source network address of packet 306 with PUBLIC 3 (the public network address of gateway B 110) to form packet 308. The gateway B 110 transmits packet 308 to the client 102.

Upon receiving packet 308, client 102 determines that the packet includes TCP FLAGS SYN/ACK and compares the parameters of the packet to pending communication sessions associated with previously transmitted packets (e.g., packet 302). However, because client 102 did not transmit a packet to PUBLIC 3 (the source network address of packet 308), client 102 determines that the parameters of packet 308 do not match the parameters of pending communication sessions. Accordingly, client 102 transmits packet 310 to gateway B 110. Packet 310 includes the TCP FLAG RST to cause the communication session associated with packet 306/308 to be terminated. Gateway B 110 modifies the packet 310 form packet 312 and transmits packet 312 to server 108, which will then terminate the communication session. In the meantime, client 102 continues to await a response to packet 302/304. However, because server 108 has already transmitted a response (packet 306/308), server 108 will not transmit another response unless another request is sent. Accordingly, client 102 will eventually timeout waiting for a response. Thus, to client 102, it appears that server 108 is not responding to requests for communication sessions. If client 102 is performing a security verification to determine if server 108 is responding to requests, client 102 will incorrectly determine that server 108 is not responding (despite server 108 having sent the response packet 306/308 that was disregarded by the client 102).

Figure 4:
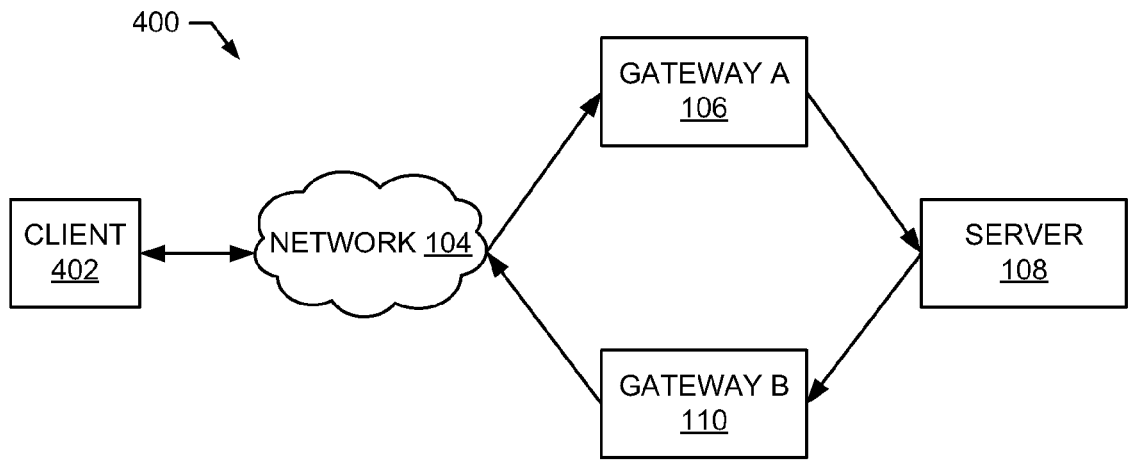
FIG. 4 illustrates an example network that includes a client that is capable of understanding and/or processing packets having mismatched parameters.

FIG. 4 illustrates an example network 400 that includes a client 402 that is capable of understanding and/or processing packets having mismatched parameters as disclosed herein. The example network 400 includes network 104, gateway A 106, server 108, and gateway B 108 that are described in conjunction with FIG. 1. The client 402 differs from the client 102 in that the client 402 is capable of handling a mismatched packet (e.g., a packet received from the server 108 via the gateway B 110 that is a response to a packet sent from the client 402 to the server 108 via the gateway A 106). If the client 402 determines that a received response packet does not match a pending communication session, the client 402 analyzes the contents of the packet to determine if the packet is a partial match to pending communication session. As used herein, parameters of a response packet match parameters of an initial packet when the parameters are responsive to the parameters of the initial packet. In other words, a response packet matches an initial packet when the source network address of the response packet is the same as the destination network address of the initial packet, a destination network address of the response packet is the same as the source network address of the initial packet, a acknowledgement identifier or other packet identifier is the next value after a sequence number or other packet identifier (e.g., incremented by one, incremented by the size of the payload of the initial packet, etc.), and/or any other parameters are responsive as is well understood in the art.

The client 402 of the illustrated example identifies a partially matching packet by comparing an acknowledgement number included in the packet with the sequence numbers of previously transmitted packets to determine if the acknowledgement number indicates a match. For example, the acknowledgement number will indicate a match when the acknowledgement number identified in the response packet equals a sequence number of a previously transmitted packet incremented by 1, incremented by a packet size, or incremented by any other number. Any algorithm or process for matching a response packet with a previously transmitted packet may be utilized. For example, the client 402 may determine that a destination port identified in a response packet matches a source port identified in a previously transmitted packet. In another example, the client 402 may determine that a source network address of a response packet is similar to a destination network address of a previously transmitted packet (e.g., the network addresses are associated with a single owner, the network addresses differ by less than a threshold number, etc.). In some implementations, the client 402 may utilize multiple algorithms or processes to determine that a response packet corresponds to a previously transmitted packet.

Figure 5:
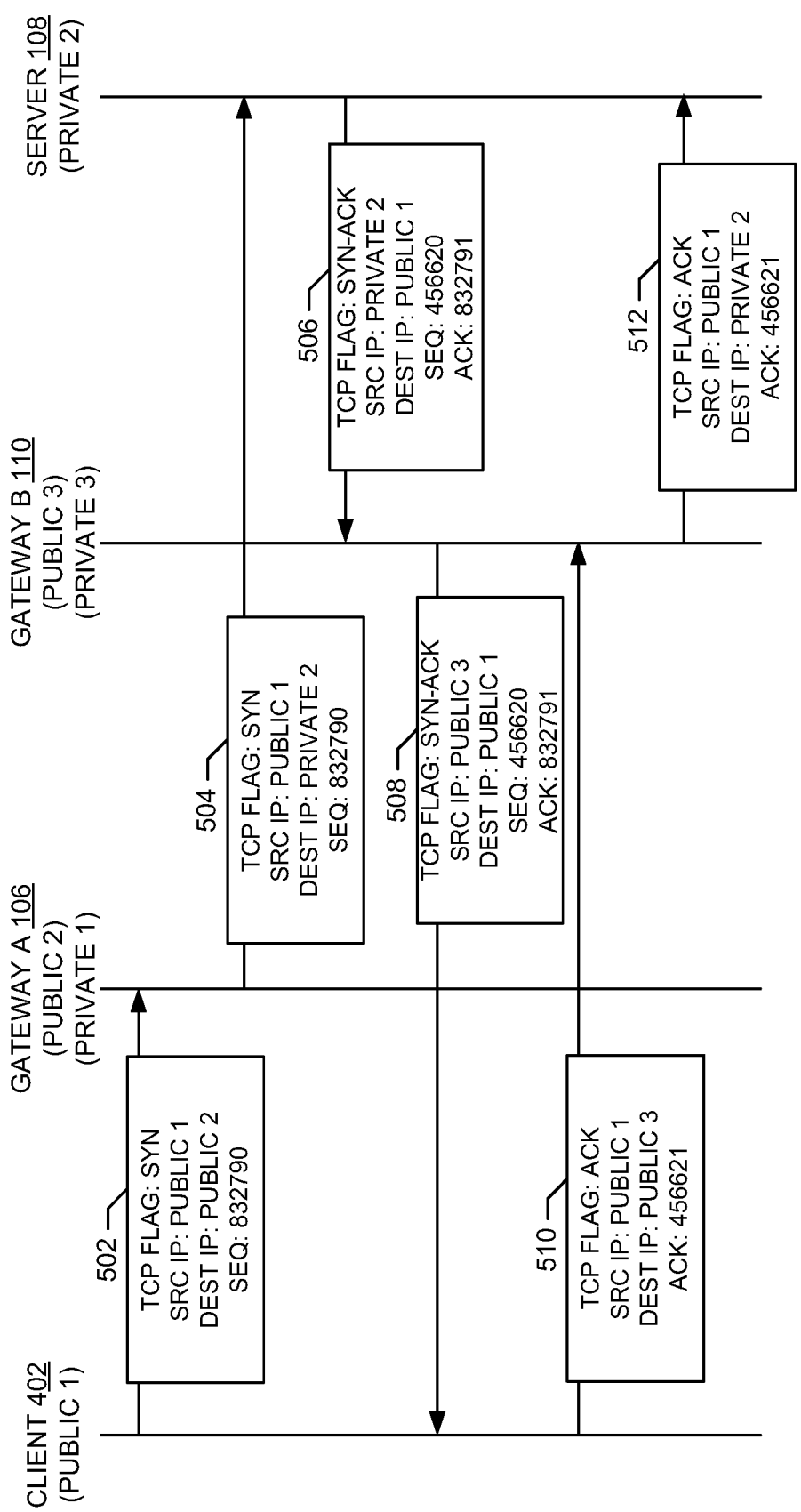
FIG. 5 is a message diagram that illustrates that ability of the client to handle packets with mismatched parameters in the example network of FIG. 4.

FIG. 5 is a message diagram that illustrates that ability of the client 402 to handle packets with mismatched parameters in the example network 400. According to the illustrated example of FIG. 4, the client 402 has a public network address of PUBLIC 1, the gateway A 106 has a public network address of PUBLIC 2 and a private network address of PRIVATE 1, the gateway B 110 has a public network address of PUBLIC 3 and a private network address of PRIVATE 3, and the server 108 has a private network address of PRIVATE 2.

The message diagram of FIG. 5 begins when the client 402 transmits packet 502 to the gateway A 106. Packet 502 is a synchronize packet to initiate a communication session with server 108 and, accordingly, the TCP FLAG parameter identifies SYN. The source network address identifies PUBLIC 1 and the destination network address identifies PUBLIC 2. Accordingly, the packet 502 is routed (e.g., via intermediate network elements) to gateway A 106. Gateway A 106 determines that the packet 502 is to be handled by server 108 (e.g., based on a destination port parameter included in the packet (not illustrated)). Accordingly, the gateway A 106 modifies the packet 502 to form packet 504 by replacing the destination network address with PRIVATE 2. The gateway A 106 forwards the packet 504 to the server 108.

The server 108, in this example, is open to receiving packets on the port identified by the packet (not shown). Accordingly, the server 108 processes the packet and responds by generating packet 506. Packet 506 includes the TCP FLAG parameter SYN-ACK, which is an acknowledgement (ACK) of packet 502/504 and an attempt to initiate a communication session between the server 108 and the client 402 (SYN). In the packet 506, the source network address parameter identifies PRIVATE 2 and the destination network address parameter identifies PUBLIC 1 (the public network address of client 402). Due to routing rules, filters, gateway settings, network settings, or any other reason, the server 108 transmits the packet 506 to gateway B 110 (instead of gateway A 106). As a part of NAT, gateway B 110 replaces the source network address of packet 506 with PUBLIC 3 (the public network address of gateway B 110) to form packet 508. The gateway B 110 transmits packet 508 to the client 402. Up to this point of FIG. 5, the network elements operate the same as the network elements described in conjunction with FIGS. 1 and 3.

Upon receiving packet 508, client 402 determines that the packet includes an ACK and compares the parameters of the packet to pending communication sessions associated with previously transmitted packets (e.g., packet 502). However, because client 402 did not transmit a packet to PUBLIC 3 (the source network address of packet 508), client 402 determines that the parameters of packet 508 do not match the parameters of pending communication sessions. Unlike client 102, however, client 402 determines that the packet is a partial match using one of the previously discussed algorithms or processes. According to the example of FIG. 5, the client 402 determines that packet 508 is a partial match to packet 502 by determining that the acknowledgement number 832791 is the sequence number of packet 502, 832790, incremented by 1. In response to determining that the packet 508 is a partial match to packet 502, the client 402 transmits an acknowledgement packet 510 to the gateway B 110, which is the network element that transmitted the response packet 508 to the client 402. The gateway B 110 modifies packet 508 by replacing the destination network address with PRIVATE 2 to form packet 512. Packet 512 is then transmitted to the server 108. Accordingly, communication sessions have been initiated from the client 402 to the server 108 and from the server 108 to the client 402. Further communication using the established communication sessions may occur via the gateway B 110. If the communication sessions are ever terminated (e.g., via timeout) and further communication is desired, the session establishment illustrated in FIG. 5 may be repeated.

In an example where the client 402 does not wish to establish a communication session, but is probing the gateway A 108, the gateway B 110, and/or the server 108 to determine if communication is possible (e.g., there is an open communication port), the message diagram of FIG. 5 may end after packet 508 and packets 510 and 512 may not be transmitted. Rather, once the client 402 determines that packet 508 is a partial match to packet 502, the client 402 determines that communication is possible (e.g., the communication port on the server 108 is open).

Figure 6:
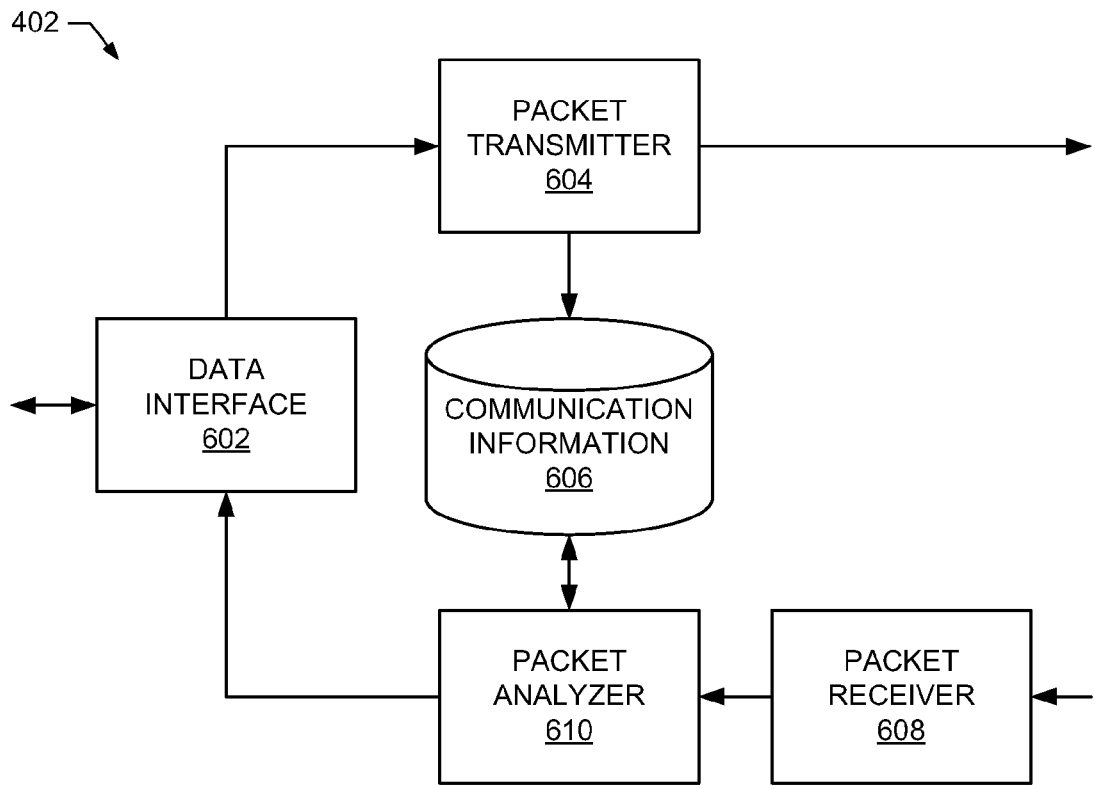
FIG. 6 is a block diagram of an example implementation of a communication interface of the client of FIG. 4.

FIG. 6 is a block diagram of an example implementation of a communication interface of the client 402. The example client 402 includes a data interface 602, a packet transmitter 604, a communication information store 606, a packet receiver 608, and a packet analyzer 610.

The data interface 602 of the illustrated example interfaces between the communication interface elements of FIG. 6 and the operating elements of the client 402. For example, the operating elements of the client 402 may require a communication session between the client 402 and the server 108 (e.g., to perform security validation of the server 108, to communicate with the server 108, etc.) and may communicate the request to the communication interface elements of FIG. 6 via the data interface 602. When packets are received by the client 402, the data interface 602 transmits information in the packets to the operating elements of the client 402.

The packet transmitter 604 receives communication data from the data interface 602 and generates and transmits packets of data to other network elements. For example, the example packet transmitter 604 transmits the packet 502 of FIG. 5. When the packet transmitter 604 generates and transmits a packet, the packet transmitter 604 stores information about the packets in the communication information store 606. For example, the packet transmitter 604 may store information about the contents of packets, information about parameters in the packets (e.g., source, destination, sequence identifier, acknowledgement identifier, packet type, etc.), information about communication sessions associated with the packets, etc. The communication information storage 606 may be any type of storage such as a database, a flash memory, a random access memory, etc.

The packet receiver 608 of the illustrated example receives packets transmitted by other network elements to the client 402. For example, the example packet receiver 608 receives the 508 of FIG. 5. The packet receiver 608 transmits received packets to the packet analyzer 610. The packet analyzer 610 analyzes packets to determine if a matching or partially matching packet or communication session is found in the communication information store 606. The example packet analyzer 610 identifies matching packets by comparing the acknowledgement identifier parameter of received packets to the sequence identifier of packets previously transmitted by the packet transmitter 604. The packet analyzer 610 may additionally or alternatively compare other parameters such as the source address, the destination address, the source port, the destination port, etc. to previously transmitted packets. When the packet analyzer 610 determines that a received packet corresponds (e.g., matches or partially matches) to a previously transmitted packet, the packet analyzed 610 transmits information (e.g., the contents of the packet) about the packet to the data interface 602. The data interface 602 may cause a response packet to be transmitted by the packet transmitter 604 and/or may provide information about the packet to the operational elements of the client 402. When the packet analyzer 610 determines that the received packet does not correspond to a previously transmitted packet, the packet analyzer 610 indicates to the data interface 602 that a match was not found. When the data interface 602 is notified that a corresponding packet was not found, the data interface 602 instructs the packet transmitter 604 to transmit a termination instruction to the source of the unmatched packet.

While an example manner of implementing the client 402 of FIG. 4 has been illustrated in FIG. 6, one or more of the elements, processes and/or devices illustrated in FIG. 6 may be combined, divided, re-arranged, omitted, eliminated and/or implemented in any other way. Further, the example data interface 602, the example packet transmitter 604, the example communication information store 606, the example packet receiver 608, the example packet analyzer 610, and/or, more generally, the example client 402 of FIG. 6 may be implemented by hardware, software, firmware and/or any combination of hardware, software and/or firmware. Thus, for example, any of the example data interface 602, the example packet transmitter 604, the example communication information store 606, the example packet receiver 608, the example packet analyzer 610, and/or, more generally, the example client 402 of FIG. 6 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example, the example data interface 602, the example packet transmitter 604, the example communication information store 606, the example packet receiver 608, and the example packet analyzer 610 are hereby expressly defined to include a tangible computer readable medium such as a memory, DVD, CD, BluRay, etc. storing the software and/or firmware. Further still, the example client 402 of FIG. 6 may include one or more elements, processes and/or devices in addition to, or instead of, those illustrated in FIG. 6, and/or may include more than one of any or all of the illustrated elements, processes and devices.

Figure 7:
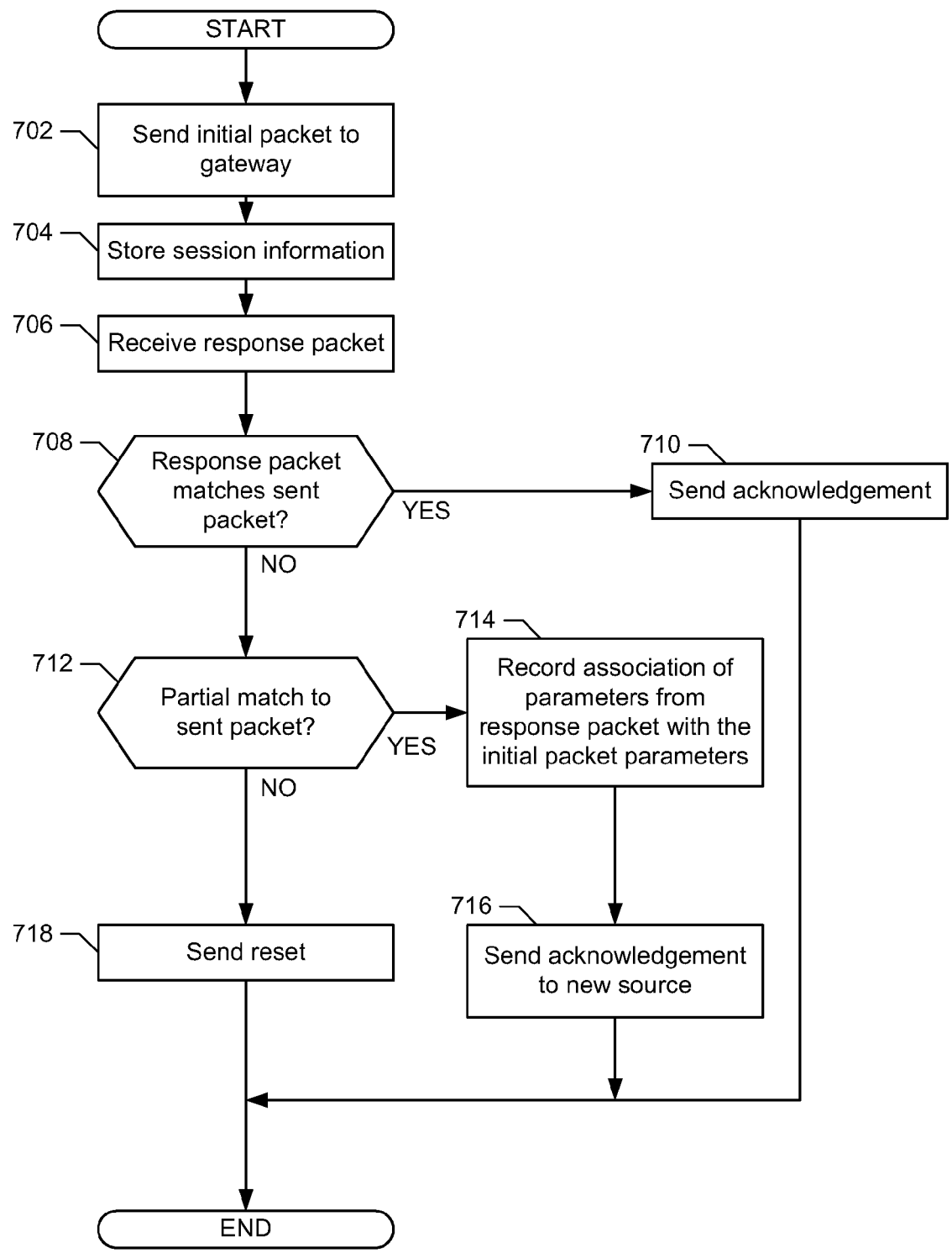
FIG. 7 is a flowchart representative of example machine readable instructions for implementing the client of FIG. 4 and FIG. 6.

A flowchart representative of example machine readable instructions for implementing the client 402 of FIG. 4 and FIG. 6 is shown in FIG. 7. In this example, the machine readable instructions comprise a program for execution by a processor such as the processor 1212 shown in the example computer 1200 discussed below in connection with FIG. 12. The program may be embodied in software stored on a tangible computer readable medium such as a CD-ROM, a floppy disk, a hard drive, a digital versatile disk (DVD), a BluRay disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIG. 7, many other methods of implementing the example client 402 may alternatively be used. For example, the order of execution of the blocks may be changed, and/or some of the blocks described may be changed, eliminated, or combined.

As mentioned above, the example process of FIG. 7 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example process of FIG. 7 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The program of FIG. 7 begins at block 702 when the packet transmitter 604 transmits an initial packet to a gateway or other network element (e.g., gateway A 106) (block 702). For example, the packet transmitter 604 may generate and transmit the packet in response to instructions from the data interface 602, which may receive instructions from the operational elements of the client 402. The packet transmitter 604 stores information about the communication session associated with the initial packet in the communication information store 606 (block 704). Alternatively, if the packet is associated with a sessionless communication, the packet transmitter 604 may store information about the communication or the packet in the communication information store 606.

The packet receiver 608 then receives a response packet to the initial packet from the gateway (though the client 402 does not yet know that the response packet is a response to the initial packet) (block 706). The packet analyzer 610 compares the response packet and its parameters to the information stored in the communication information store to determine if the response packet matches to a previously transmitted packet (e.g., the initial packet) (block 708). For example, the response packet matches a previously transmitted packet when all of the parameters of the response packet correspond to the parameters of a previously transmitted packet (e.g., the source network address of the response packet matches the destination network address of the previous packet, the destination network address of the response packet matches the source network address of the previous packet, the source port of the response packet matches the destination port of the previous packet, the destination port of the response packet matches the source port of the previous packet, the acknowledgement identifier of the response packet is the next number from the sequence number of a previous packet (e.g., incremented by one), and any other appropriate parameters match).

If the response packet matches a previously transmitted packet (block 708), the data interface 602 causes the packet transmitter 604 to transmit an acknowledgement of the response packet (block 710). Alternatively, any other suitable acknowledgement of the response packet may occur. For example, the response packet may indicate that communication with the gateway is possible and, therefore, the data interface 602 records an identification that the gateway accepts a communication session, will notify the operational elements of the client 402 that the gateway accepts a communication session, etc.

If the response packet does not match a previously transmitted packet (block 708), the packet analyzer 610 determines if the response packet is a partial match to a previously transmitted packet (e.g., corresponds to a previously transmitted packet) (block 712). The packet analyzer 610 may utilize any of the previously described techniques to determine if the response packet is a partial match to a previously transmitted packet, a pending communication session, etc.

If the response packet is a partial match to a previously transmitted packet (block 712), the packet analyzer 610 records the association of the response packet and the previously transmitted packet (e.g., the initial packet of block 702) (block 714). The association may be recorded in, for example, a lookup table so that future communication with the gateway or using the same communication session will be translated by the lookup table. In other words, when the client 402 wishes to communicate with the gateway, the packet transmitter 604 will look to the lookup table and will instead communicate with the source of the response packet as shown by packet 510 of FIG. 5. Thus, the data interface 602 causes the packet transmitter 604 to transmit an acknowledgement packet to the source of the response packet (block 716). Accordingly, a communication session between the client 402 and a gateway (e.g., gateway B 110) to connect to a server (e.g., server 108) has been established. Further communication with the server 108 can now occur by the packet transmitter 604 transmitting packets to the gateway that responded (e.g., gateway B 110) and the packet receiver 608 receiving packets from the gateway. In some implementations, the packet analyzer 610 will need to stop a networking stack of the client 402 from transmitting a communication session termination or reset. For example, the client 402 may stop the networking stack using the Linux application iptables by filtering the packets that are a partial match prior to the network stack transmitting a connection termination or reset.

If the response packet is not a partial match to a previously transmitted packet (block 712), the data interface 602 causes the packet transmitter 604 to transmit a packet to reset or terminate the connection with the gateway that transmitted the response packet (block 718).

After the acknowledgement is sent (block 710 and 718) or the reset packet is sent (block 718), the instructions illustrated in FIG. 7 terminate. However, further communication may and will likely occur. For example, the client 402 may continue to communicate with the gateway that transmitted the response. Additionally or alternatively, the client 402 may attempt further communication with the gateway to which the initial packet was transmitted (e.g., the client 402 may query other ports of the gateway).

Figure 8:
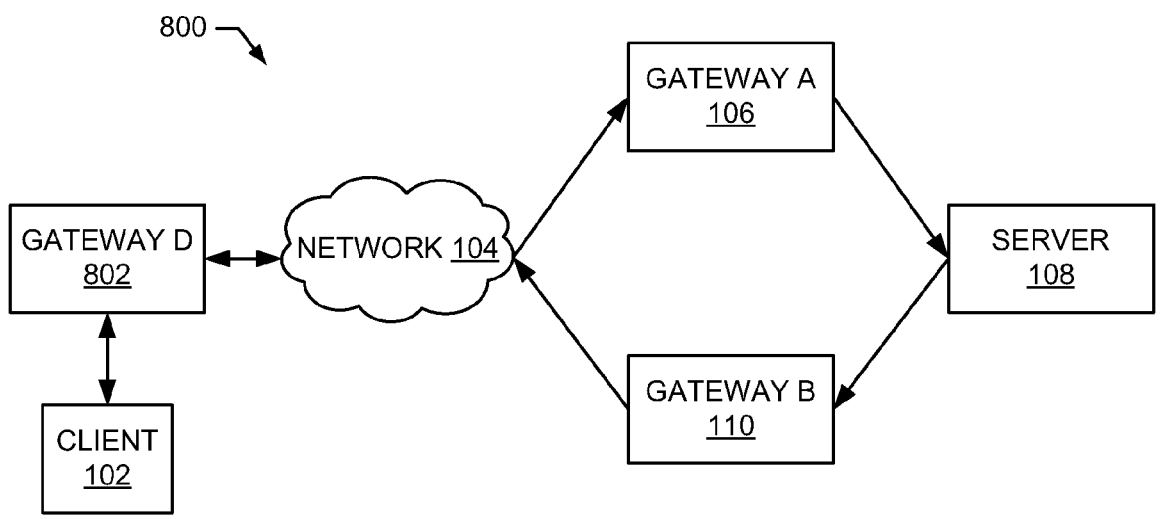
FIG. 8 illustrates an example network that includes a gateway that is capable of understanding and/or processing packets having mismatched parameters.

FIG. 8 illustrates an example network 800 that includes a gateway D 802 that is capable of understanding and/or processing packets have mismatched parameters as disclosed herein to facilitate access to the server 108 by the client 102 (described in conjunction with FIGS. 1-3), which does not understand mismatched parameters in packets. The example network 800 includes the client 102, the network 104, the gateway A 106, the server 108, and the gateway B 108 that are described in conjunction with FIG. 1. The network 800 also includes the gateway D 802 that is capable of handling a mismatched packet (e.g., a packet received from the server 108 via the gateway B 110 that is a response to a packet sent from the client 402 via the gateway D 802 to the server 108 via the gateway A 106). If the gateway D 802 determines that a received response packet does not match a pending communication session (e.g., a source network address parameter does not match a destination network address of a previously transmitted packet), the gateway D 802 analyzes the contents of the packet to determine if the packet is a partial match to pending communication session and handles communication transparently to the client 102.

The gateway D 802 may be any type of network element that intercedes between another network element (e.g., the client 102) and other elements of a network (e.g., the gateway A 106). The gateway D 802 may be a gateway, a router, a switch, a bridge, a proxy server, a modem, or any other network element.

The gateway D 802 of the illustrated example identifies a partially matching packet by comparing an acknowledgement number included in the packet with the sequence numbers of previously transmitted packets to determine if the acknowledgement number indicates a match. For example, the acknowledgement number will indicate a match when the acknowledgement number identified in the response packet equals a sequence number of a previously transmitted packet incremented by 1, incremented by a packet size, or incremented by any other number. Any algorithm or process for matching a response packet with a previously transmitted packet may be utilized. For example, the gateway D 802 may determine that a destination port identified in a response packet matches a source port identified in a previously transmitted packet. In another example, the gateway D 802 may determine that a source network address of a response packet is similar to a destination network address of a previously transmitted packet (e.g., the network addresses are associated with a single owner, the network addresses differ by less than a threshold number, etc.). In some implementations, the gateway D 802 may utilize multiple algorithms or processes to determine that a response packet corresponds to a previously transmitted packet.

When the gateway D 802 determines that a received packet does not match a previously transmitted packet but does correspond with a previously transmitted packet, the gateway D 802 transforms the packet prior to transmitting the packet to the client 102. The gateway D 802 transforms the packet by replacing the parameters (e.g., the source network address of the packet) so that the packet matches the previously transmitted packet. An example of this transformation is illustrated in the message diagram of FIG. 9.

Figure 9:
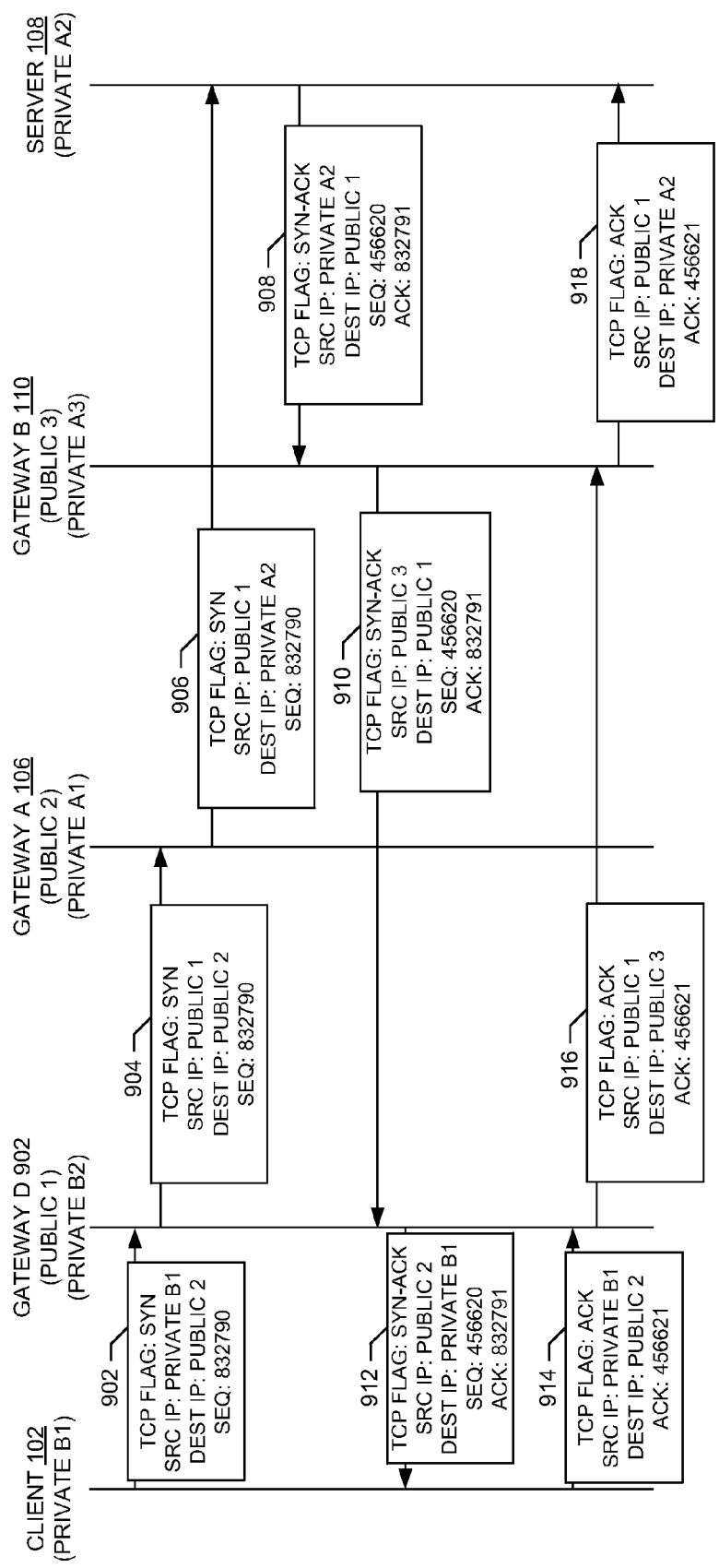
FIG. 9 is a message diagram that illustrates that ability of the gateway to handle packets with mismatched parameters in the example network of FIG. 8.

FIG. 9 is a message diagram illustrating communication between the client 102 (via the gateway 802) and the server 108 in the network 800 of FIG. 8. According to the illustrated example of FIG. 9, the client 102 has a private network address of PUBLIC B1, the gateway D 802 has a public network address of PUBLIC 1 and a private network address of PRIVATE B2, the gateway A 106 has a public network address of PUBLIC 2 and a private network address of PRIVATE A1, the gateway B 110 has a public network address of PUBLIC 3 and a private network address of PRIVATE A3, and the server 108 has a private network address of PRIVATE A2.

The message diagram of FIG. 5 begins when the client 102 transmits packet 902 destined for the gateway A 106 to the gateway D 802. Packet 902 is a synchronize packet to initiate a communication session with server 108 and, accordingly, the TCP FLAG parameter identifies SYN. The source network address identifies PRIVATE B1 and the destination network address identifies PUBLIC 2. The gateway D 802 performs a source NAT by replacing the source network address of packet 902 with PUBLIC 1 to form packet 904. The packet 902 is routed (e.g., via intermediate network elements) to gateway A 106. Gateway A 106 determines that the packet 904 is to be handled by server 108 (e.g., based on a destination port parameter included in the packet (not illustrated)). Accordingly, the gateway A 106 performs a destination NAT to form packet 906 by replacing the destination network address of packet 904 with PRIVATE A2. The gateway A 106 forwards the packet 906 to the server 108.

The server 108, in this example, is open to receiving packets on the port identified by the packet (not shown). Accordingly, the server 108 processes the packet and responds by generating packet 908. Packet 908 includes the TCP FLAG parameter SYN-ACK, which is an acknowledgement (ACK) of packet 902/904/906 and an attempt to initiate a communication session between the server 108 and the client 102 (SYN). In the packet 908, the source network address parameter identifies PRIVATE A2 and the destination network address parameter identifies PUBLIC 1 (the public network address of the gateway D 802 that was identified in the packet 906 received by the server 108). Due to routing rules, filters, gateway settings, network settings, or any other reason, the server 108 transmits the packet 908 to gateway B 110 (instead of gateway A 106). Gateway B 110 performs a source NAT by replacing the source network address of packet 908 with PUBLIC 3 (the public network address of gateway B 110) to form packet 910. The gateway B 110 transmits packet 910 to the gateway D 802. Up to this point of FIG. 9, the network elements operate in the same manner as the network elements described in conjunction with FIG. 5 except that the gateway D 802 has interconnected client 102 to the network.

Upon receiving packet 910, the gateway D 802 determines that the packet includes an ACK and compares the parameters of the packet to pending communication sessions associated with previously transmitted packets (e.g., packet 904). However, because client 102/gateway D 802 did not transmit a packet to PUBLIC 3 (the source network address of packet 910), gateway D 802 determines that the parameters of packet 910 do not match the parameters of pending communication sessions. Unlike client 102 and prior art gateways, however, gateway D 802 determines that the packet is a partial match using one of the previously discussed algorithms or processes. According to the example of FIG. 9, the gateway D 802 determines that packet 910 is a partial match to packet 904 by determining that the acknowledgement number 832791 is the sequence number of packet 904, 832790, incremented by 1. In response to determining that the packet 910 is a partial match to packet 904, the gateway D 802 performs a destination NAT to replace the destination network address of packet 910 with the address of client 102, PRIVATE B1 (as shown in packet 912). The gateway D 802 also replaces the source network address of packet 910 with the destination network address identified in packet 902/904 (as shown in packet 912).

Accordingly, due to the translation by gateway D 802 of the source network address, when the packet 912 is transmitted to the client 102, the client 102 determines that the packet 912 matches to the packet 902 and is unaware that packet parameter mismatched occurred between packets 910 and 904 at the gateway D 802. Thus, the client 102 may be any network element and need not be modified to identify mismatched packets.

The client 102 then transmits packet 914 to acknowledge packet 908/910/912. The packet 912 has a destination network address of PUBLIC 2, which is associated with gateway A 106, because the client 102 is unaware that the response packet 908/910/912 was received from the gateway B 110. Alternatively, if the gateway D 802 previously notified the client 102 about the packet parameter mismatch, the client 102 could include the network address of the gateway B 110 as the destination network address.

When the gateway D 802 receives the packet 914, the gateway D 802 determines that the packet belongs to the communication session in which a mismatched packet was previously received. Accordingly, the gateway D 802 replaces the destination network address of packet 914 with the network address from which the previous response packet was received, PUBLIC 3 (as shown in packet 916). The gateway D 802 also performs source NAT to replace the source network address of packet 914 with PUBLIC 1. Packet 916 is then transmitted to gateway B 110. Gateway B 110 modifies packet 916 by replacing the destination network address with PRIVATE A2 to form packet 918. Packet 918 is then transmitted to the server 108. Accordingly, communication sessions have been initiated from the client 102 to the server 108 and from the server 108 to the client 102. Further communication using the established communication sessions may occur by the gateway D 802 translating communications from the client 102 directed to the gateway A 106 to identify the gateway B 110. If the communication sessions are ever terminated (e.g., via timeout) and further communication is desired, the session establishment illustrated in FIG. 9 may be repeated.

In an example where the client 102 does not wish to establish a communication session, but is probing the gateway A 108, the gateway B 110, and/or the server 108 to determine if communication is possible (e.g., there is an open communication port), the message diagram of FIG. 9 may end after packet 912 and packets 914, 916, and 918 may not be transmitted. Rather, once the client 102 receives packet 912 (because gateway D 802 has transformed the packet 910 to match packet 902), the client 102 determines that communication is possible (e.g., the communication port on the server 108 is open).

Figure 10:
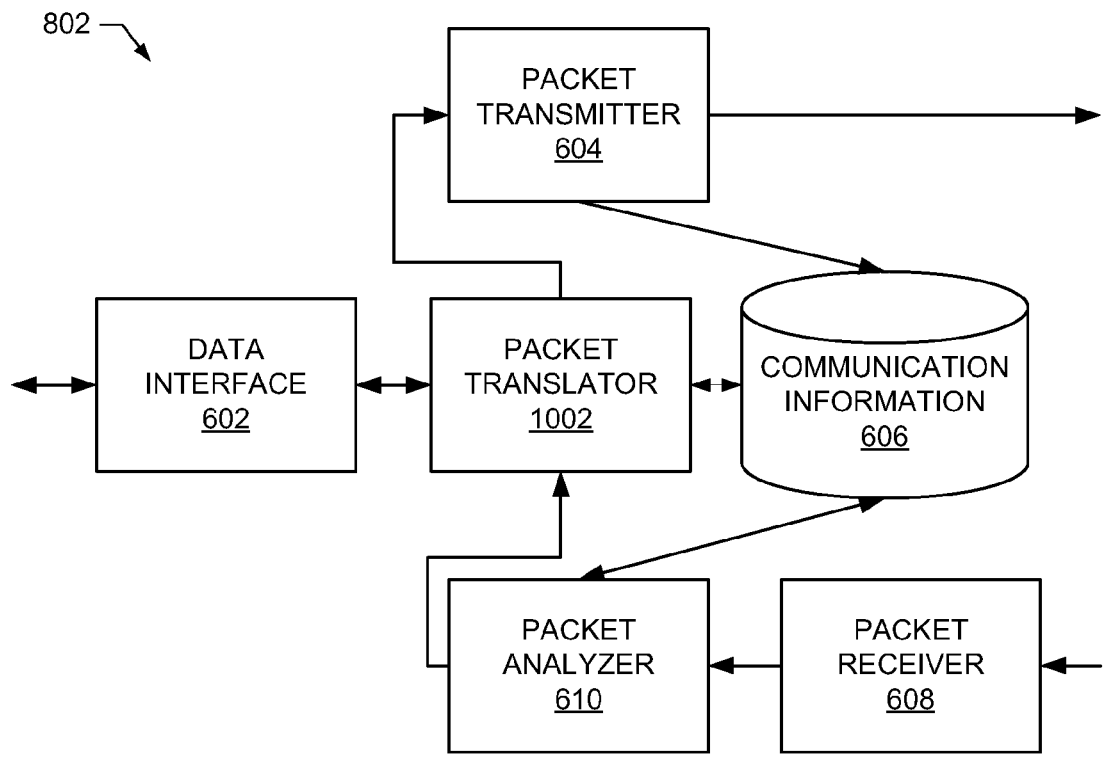
FIG. 10 is a block diagram of an example implementation of a communication interface of the gateway of FIG. 8.

FIG. 10 is a block diagram of an example implementation of a communication interface of the gateway D 802. The example gateway D 802 includes the data interface 602, the packet transmitter 604, the communication information store 606, the packet receiver 608, and the packet analyzer 610, which have been described in conjunction with FIG. 6 and are not described further except in instances where their operation differs in the example of FIG. 10. The example gateway D 802 also includes a packet translator 1002.

The packet translator 1002 translates packets so that the devices communicating via the gateway 802 can communicate in instances where packet parameter mismatch occurs without those devices being aware of the packet parameter mismatch and/or without the devices needing to adjust communications due to the packet parameter mismatch.

When the packet analyzer 610 determines that a packet received by the packet receiver 608 is only a partial match to a previously transmitted packet, the packet translator 1002 translates the packet so that translated packet matches the previously transmitted packet and the packet is transmitted to the device to which the packet is directed (e.g., client 102) by the data interface 602. In the example of FIG. 9, the packet translator 1002 replaces the source network address of packet 910 to form packet 912 so that the response appears to have been received from the destination to which client 102 transmitted packet 902. The packet translator 1002 determines the information for translating packets by accessing the communication information storage 606. For example, once the packet analyzer 610 determines the partially matching packet, the packet translator 1002 retrieves the matching packet parameters for modifying the response packet.

When the data interface 602 attempts to transmit a packet for a communication session, the packet translator 1002 determines if the communication session has been previously identified as having a packet parameter mismatch. For example, the packet translator 1002 consults the lookup table stored in the communication information storage 606. When the packet to be transmitted is associated with a communication session that has been identified as having a packet parameter mismatch, the packet translation 1002 transforms the packet to account for the parameter mismatch. For example, in the example of FIG. 9, the packet translator 1002 translates the destination network address of packet 914 to identify the network address of gateway B 110 from which the response packet 910 was transmitted. The translated packet is then transmitted to the packet transmitter 604 for transmission to the destination identified in the transformed packet.

While an example manner of implementing the gateway D 802 of FIG. 8 has been illustrated in FIG. 10, one or more of the elements, processes and/or devices illustrated in FIG. 10 may be combined, divided, re-arranged, omitted, eliminated and/or implemented in any other way. Further, the example data interface 602, the example packet transmitter 604, the example communication information store 606, the example packet receiver 608, the example packet analyzer 610, the example packet translator 1002, and/or, more generally, the example gateway D 802 of FIG. 10 may be implemented by hardware, software, firmware and/or any combination of hardware, software and/or firmware. Thus, for example, any of the example data interface 602, the example packet transmitter 604, the example communication information store 606, the example packet receiver 608, the example packet analyzer 610, the example packet translator 1002, and/or, more generally, the example gateway D 802 of FIG. 10 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example, the example data interface 602, the example packet transmitter 604, the example communication information store 606, the example packet receiver 608, the example packet analyzer 610, and the example packet translator 1002 are hereby expressly defined to include a tangible computer readable medium such as a memory, DVD, CD, BluRay, etc. storing the software and/or firmware. Further still, the example gateway D 802 of FIG. 10 may include one or more elements, processes and/or devices in addition to, or instead of, those illustrated in FIG. 10, and/or may include more than one of any or all of the illustrated elements, processes and devices.

Figure 11:
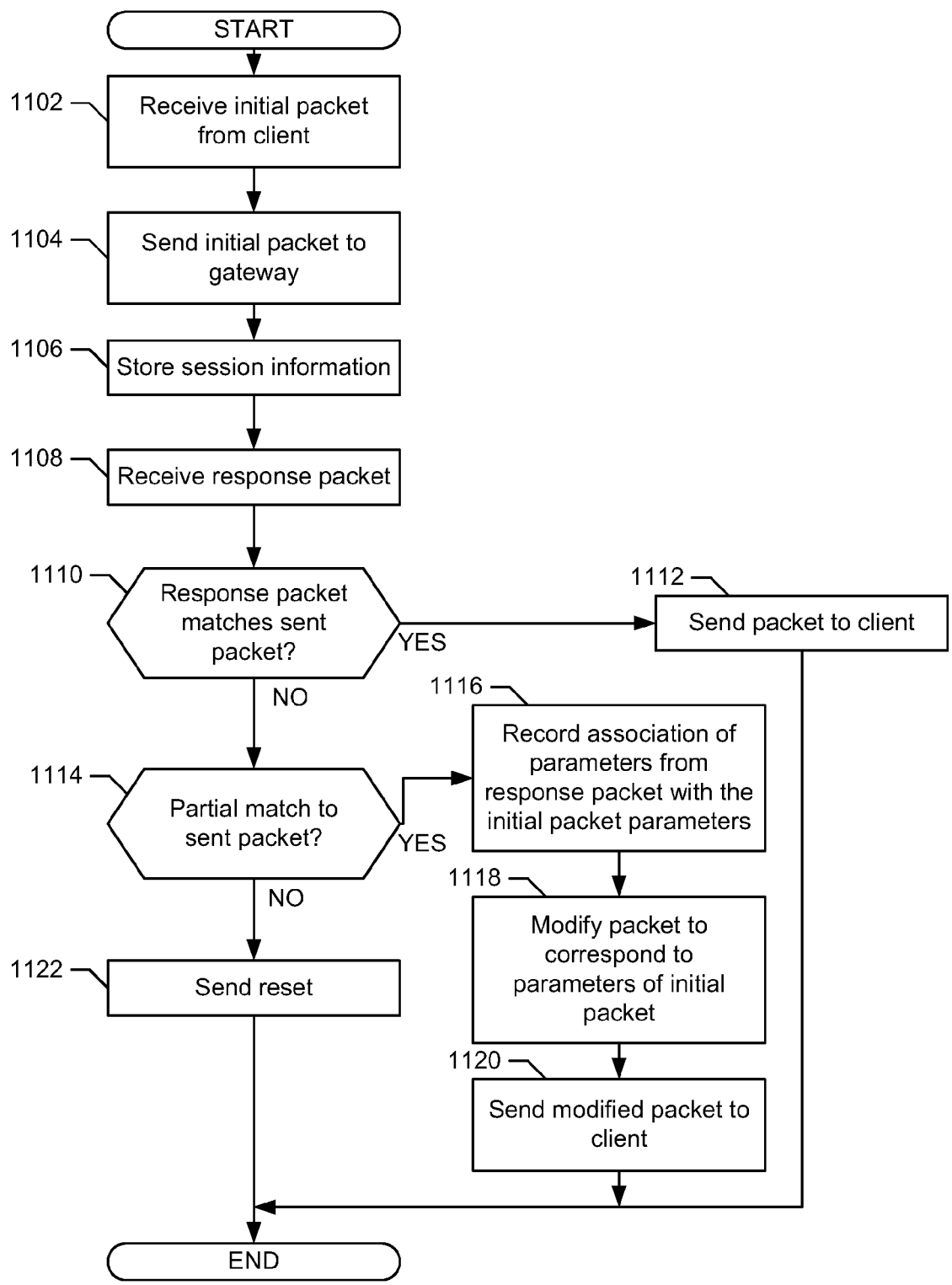
FIG. 11 is a flowchart representative of example machine readable instructions for implementing the gateway of FIG. 8 and FIG. 10.

A flowchart representative of example machine readable instructions for implementing the gateway D 802 of FIG. 8 and FIG. 10 is shown in FIG. 11. In this example, the machine readable instructions comprise a program for execution by a processor such as the processor 1212 shown in the example computer 1200 discussed below in connection with FIG. 12. The program may be embodied in software stored on a tangible computer readable medium such as a CD-ROM, a floppy disk, a hard drive, a digital versatile disk (DVD), a BluRay disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIG. 11, many other methods of implementing the example gateway D 802 may alternatively be used. For example, the order of execution of the blocks may be changed, and/or some of the blocks described may be changed, eliminated, or combined.

As mentioned above, the example process of FIG. 11 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). Additionally or alternatively, the example process of FIG. 11 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information).

The program of FIG. 11 begins at block 1102 when the data interface 602 receives an initial packet from a device communicatively coupled to the gateway D 802 (e.g., client 102) (e.g., communicatively coupled via a network) (block 1102). The packet transmitter 604 performs source NAT (if needed) and transmits the initial packet to a gateway or other network element (e.g., gateway A 106) (block 1104). The packet transmitter 604 stores information about the communication session associated with the initial packet in the communication information store 606 (block 1106). Alternatively, if the packet is associated with a sessionless communication, the packet transmitter 604 may store information about the communication or the packet in the communication information store 606.

The packet receiver 608 then receives a response packet to the initial packet from the gateway (though the gateway D 802 does not yet know that the response packet is a response to the initial packet) (block 1108). The packet analyzer 610 compares the response packet and its parameters to the information stored in the communication information store to determine if the response packet matches to a previously transmitted packet (e.g., the initial packet) (block 1110). For example, the response packet matches a previously transmitted packet when all of the parameters of the response packet correspond to the parameters of a previously transmitted packet (e.g., the source network address of the response packet matches the destination network address of the previous packet, the destination network address of the response packet matches the source network address of the previous packet, the source port of the response packet matches the destination port of the previous packet, the destination port of the response packet matches the source port of the previous packet, the acknowledgement identifier of the response packet is the next number from the sequence number of the previous packet (e.g., incremented by one), and any other appropriate parameters match).

If the response packet matches a previously transmitted packet (block 1110), the data interface 602 sends the packet to the communicatively coupled device (e.g., client 102) (block 1112). The response packet is not transformed due to packet mismatch, but, in the illustrated example, destination NAT is performed so that the packet is transmitted from the gateway D 802 to the client 102.

If the response packet does not match a previously transmitted packet (block 1110), the packet analyzer 610 determines if the response packet is a partial match to a previously transmitted packet (e.g., corresponds to a previously transmitted packet) (block 1114). The packet analyzer 610 may utilize any of the previously described techniques to determine if the response packet is a partial match to a previously transmitted packet, a pending communication session, etc.

If the response packet is a partial match to a previously transmitted packet (block 1114), the packet analyzer 610 records the association of the response packet and the previously transmitted packet (e.g., the initial packet of block 1102) (block 1116). The association may be recorded in, for example, a lookup table so that future communication with the gateway or using the same communication session will be translated by the lookup table. The packet translator 1002 then modifies the packet to correspond to the initial packet (block 1118). For example, the packet translator 1002 replaces the source network address of the packet with the destination network address of the initial packet (e.g., as illustrated by packets 910 and 912 of FIG. 9). The data interface 602 then transmits the packet to the communicatively coupled device from which the initial packet was sent (block 1120). According to the illustrated example, the data interface 602 performs destination NAT so that the packet is transmitted from the gateway D 802 to the client 102.

If the response packet is not a partial match to a previously transmitted packet (block 1114), the data interface 602 causes the packet transmitter 604 to transmit a packet to reset or terminate the connection with the remote gateway that transmitted the response packet (block 1122).

After the packet is sent to the client 102 (block 1112 and 1120) or the reset packet is sent (block 1122), the instructions illustrated in FIG. 11 terminate. However, further communication may and will likely occur. For example, the client 102 may continue to communicate via the gateway D 802 with the remote gateway that transmitted the response. Additionally or alternatively, the client 102 may attempt further communication with the remote gateway to which the initial packet was transmitted. When the client 102 sends communications to the remote gateway which has previously been identified as resulting in mismatched packets by the packet analyzer 610, the packet translator 1002 translates the packets to adjust for the packet parameter mismatch (as described in conjunction with FIG. 10) before the packet is transmitted by the packet transmitter 604. Accordingly, the client 102 can communicate with the server 108 without knowledge of and/or without regard to the packet mismatch that occurred.

Figure 12:
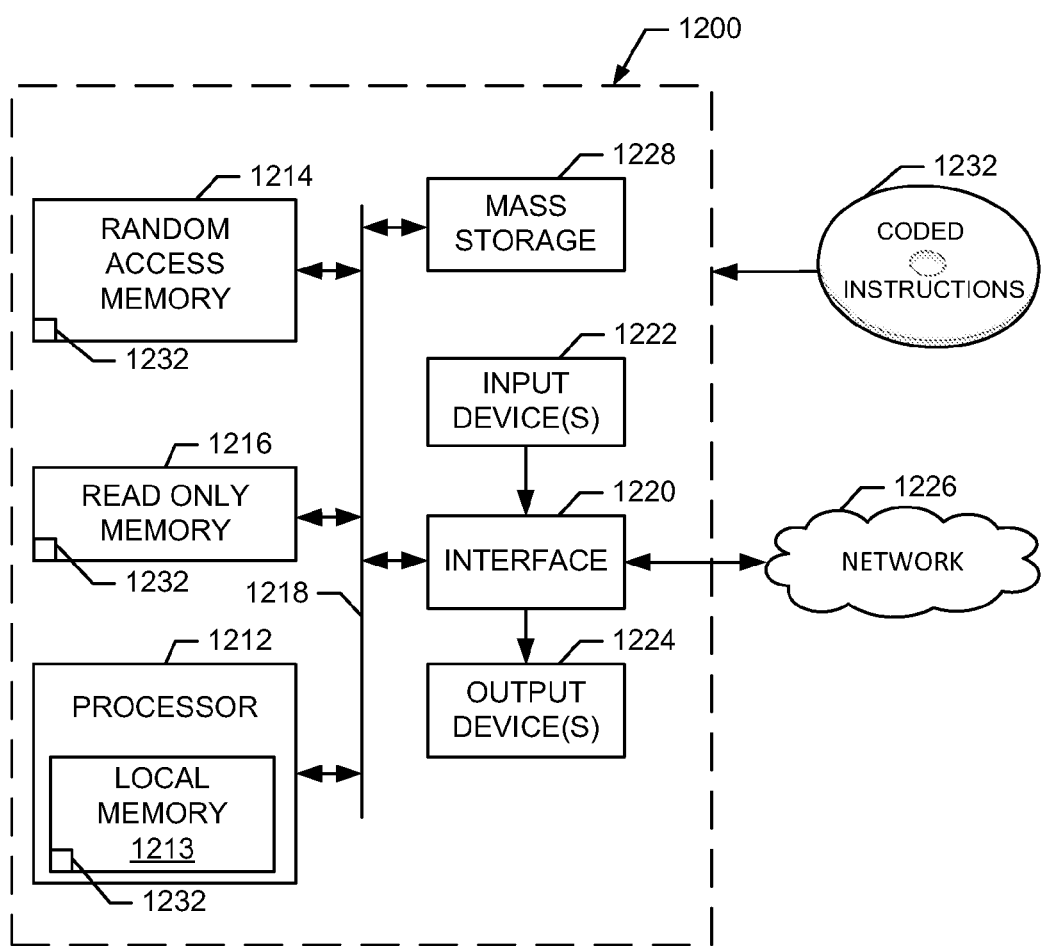
FIG. 12 is a block diagram of an example computer capable of executing the instructions of FIGS. 7 and 11 to implement the client of FIGS. 4 and 6 and/or the gateway of FIGS. 8 and 10.

FIG. 12 is a block diagram of an example computer 1200 capable of executing the instructions of FIGS. 7 and 11 to implement the client 402 of FIGS. 4 and 6 and/or the gateway D 802 of FIGS. 8 and 10. The computer 1200 can be, for example, a server, a personal computer, a mobile phone (e.g., a cell phone). a personal digital assistant (PDA), an Internet appliance, a DVD player, a CD player, a digital video recorder, a BluRay player, a gaming counsel, a personal video recorder, a set top box, or any other type of computing device.

The processing system 1200 of the instant example includes a processor 1212. For example, the processor 1212 can be implemented by one or more microprocessors or controllers from any desired family or manufacturer.

The processor 1212 is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The computer 1200 also includes an interface circuit 1220. The interface circuit 1220 may be implemented by any type of interface standard, such as an Ethernet interface, a universal serial bus (USB), and/or a PCI express interface.

One or more input devices 1222 are connected to the interface circuit 1220. The input device(s) 1222 permit a user to enter data and commands into the processor 1212. The input device(s) can be implemented by, for example, a keyboard, a mouse, a touchscreen, a track-pad, a trackball, isopoint and/or a voice recognition system.

One or more output devices 1224 are also connected to the interface circuit 1220. The output devices 1224 can be implemented, for example, by display devices (e.g., a liquid crystal display, a cathode ray tube display (CRT), a printer and/or speakers). The interface circuit 1220, thus, typically includes a graphics driver card.

The interface circuit 1220 also includes a communication device (e.g., communication device 56) such as a modem or network interface card to facilitate exchange of data with external computers via a network 1226 (e.g., an Ethernet connection, a digital subscriber line (DSL), a telephone line, coaxial cable, a cellular telephone system, etc.).

The computer 1200 also includes one or more mass storage devices 1228 for storing software and data. Examples of such mass storage devices 1228 include floppy disk drives, hard drive disks, compact disk drives and digital versatile disk (DVD) drives. The mass storage device 1228 may implement the communication information store 606.

The coded instructions of FIGS. 7 and 11 may be stored in the mass storage device 1228, in the volatile memory 1214, in the non-volatile memory 1216, and/or on a removable storage medium such as a CD, DVD, BluRay, etc.

Example methods and/or apparatus to facilitate communication in networks in which packet parameter mismatch occurs are disclosed above. Because current networking standards dictate that when a mismatched packet is received a connection termination is transmitted, disclosed methods and apparatus facilitate detection of the mismatched packets that are not detected by network elements that follow such standards. Some disclosed example methods and/or apparatus facilitate validation, verification, and/or probing to determine if a network element is open to communication (e.g., includes an open port, forwards communications to a device with an open port, etc.). Such validation, verification, and/or probing is of increased importance when people of malevolent intent recognize that mismatched packets are being sent (where the owners of a server or third party validation services are not aware that the packets are being sent due to the mismatch) and utilize the open port for malicious goals. While the foregoing describes communications including packets, example methods and apparatus disclosed herein may be utilized with communication protocols and/or schemes that do not use packets.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to determine whether a first network device is responsive to network requests, the method comprising:
    sending, from a second network device, a first packet with a destination network address identifying a first network address of a first gateway associated with the first network device;
    receiving, at the second network device, a second packet from a second gateway associated with the first network device, the second packet including a source network address identifying a second network address of the second gateway, wherein the second packet is not transmitted via the first gateway and the first network device sent the second packet in response to the first packet to acknowledge the first packet;

determining that the destination network address of the first packet does not match the source network address of the second packet;

comparing a first parameter of the first packet to a second parameter of the second packet to determine, based on the comparison, that the second packet is a response to the first packet; and in response to determining that the second packet is the response and determining that the destination network address does not match the source network address, determining that the first network device is responsive to the network requests and that a network address mismatch exists.

2. A method as defined in claim 1, wherein the first packet is addressed to a communication port and determining that that the first network device is responsive to the network requests comprises determining that the communication port is open.

3. A method as defined in claim 1, further comprising, in response to determining that the second packet is the response, sending an acknowledgement of the second packet to the source network address of the second packet.

4. A method as defined in claim 1, further comprising:
replacing the source network address of the second packet with a destination network address of the first packet to generate a transformed packet; and
sending the transformed packet to a client device different from the first network device.

5. A method as defined in claim 1, wherein determining that the second packet is the response is based on an acknowledgement identifier of the second packet.

6. A method as defined in claim 1, wherein determining that the second packet is the response comprises determining that the second parameter is a sequence identifier and is equal to the first parameter incremented by one.

7. A method as defined in claim 1, further comprising storing an association of at least one of the second packet or the second parameter with the first packet.

8. The method of claim 1, wherein the source network address is a public network address of the second gateway.

9. The method of claim 8, wherein the first network device is assigned a network address that is not the source network address or the destination network address.

10. A network element comprising:
a packet transmitter to send, from a second network device, a first packet with a destination network address identifying a first network address of a first gateway associated with a first network device different from the network element;
a packet receiver to receive a second packet from a second gateway associated with the first network device, the second packet including a source network address identifying a second network address of the second gateway, the second packet not transmitted via the first gateway, the second packet sent by the first device to acknowledge the first packet; and
a packet analyzer to determine that the destination network address of the first packet does not match the source network address of the second packet, and to compare a first parameter of the first packet to a second parameter of the second packet to determine, based on the comparison, whether the second packet is a response to the first packet, and, in response to determining that the second packet is the response and that the destination network address does not match the source network address, the packet analyzer is to determine that the first network device is responsive to network requests and that a packet network address mismatch exists.

11. A network element as defined in claim 10, wherein the first packet is addressed to a communication port and the packet analyzer is to determine that the first network device is responsive to network requests by determining whether the communication port is open.

12. A network element as defined in claim 10, further comprising a data interface to send an acknowledgement of the second packet to the source network address of the second packet in response to the packet analyzer determining that the second packet is the response.

13. A network element as defined in claim 10, further comprising:
a packet translator to replace the source network address of the second packet with a destination network address of the first packet to generate a transformed packet; and
a data interface to send the transformed packet to a client device different from the first network device.

14. A network element as defined in claim 10, wherein the packet analyzer is further to determine that the second packet is the response based on an acknowledgement identifier of the second packet.

15. A network element as defined in claim 10, wherein the packet analyzer is to determine that the second packet is the response by determining that the the second parameter is a sequence identifier and is equal to the first parameter incremented by one.

16. A network element as defined in claim 10, wherein the packet analyzer is further to store an association of at least one of the second packet or the second parameter with the first packet.

17. A network element as defined in claim 10, wherein the network element is at least one of a gateway, a router, a switch, a bridge, a proxy server, or a modem.

18. A tangible computer readable storage device comprising instructions that, when executed, cause a second network device to at least:
send a first packet with a destination network address identifying a first network address of a first gateway associated with a first network device;
determine that the destination network address of the first packet does not match a source network address of a second packet from a second gateway;
compare a first parameter of the first packet to a second parameter of the second packet to determine, based on the comparison, whether the second packet is a response to the first packet, wherein the source network address identifies a second network address of the second gateway, the second packet is not transmitted via the first gateway and the first network device sent the second packet in response to the first packet; and
in response to determining whether the second packet is the response and to determining that the destination network address does not match the source network address, determine whether the first network device is responsive to network requests and that a network address mismatch exists.

19. A computer readable storage device as defined in claim 18, wherein the first packet is addressed to a communication port and the instructions, when executed, cause the second network device to determine whether the first network device is responsive to the network requests by determining whether the communication port is open.

20. A computer readable storage device as defined in claim 18, wherein the instructions, when executed, cause the second network device to, in response to determining that the second packet is the response, send an acknowledgement of the second packet to the source network address of the second packet.

21. A computer readable storage device as defined in claim 18, wherein the instructions, when executed, cause the second network device to:
- replace the source network address of the second packet with a destination network address of the first packet to generate a transformed packet; and
- send the transformed packet to a client device different from the first network device.

22. A computer readable storage device as defined in claim 18, wherein the instructions, when executed, cause the second network device to determine that the second packet is the response by examining an acknowledgement identifier of the second packet.

23. A computer readable storage device as defined in claim 18, wherein the instructions, when executed, cause the second network device to determine that the second packet is the response if the second parameter is a sequence identifier and is equal to the first parameter of the first packet incremented by one.

24. A computer readable storage device as defined in claim 18, wherein the instructions, when executed, cause the second network device to store an association of at least one of the second packet or the second parameter with the first packet.

* * * * *

UNITED STATES PATENT AND TRADEMARK OFFICE
CERTIFICATE OF CORRECTION

PATENT NO. : 9,172,675 B2  
APPLICATION NO. : 13/483009  
DATED : October 27, 2015  
INVENTOR(S) : Claudius et al.

Page 1 of 1

It is certified that error appears in the above-identified patent and that said Letters Patent is hereby corrected as shown below:

Claims

Column 20, line 2, claim 10 (Paragraph 1), "packet," should be removed.

Column 21, line 21, claim 23 (Paragraph 4), "of the first packet" should be removed.

Signed and Sealed this
Twenty-second Day of March, 2016

Michelle K. Lee
*Director of the United States Patent and Trademark Office*